June 16, 1925.  1,542,545
W. S. ELLIOTT
SEPARATION OF AIR AND DISSOLVED GASES FROM LIQUIDS
Filed Nov. 26, 1920
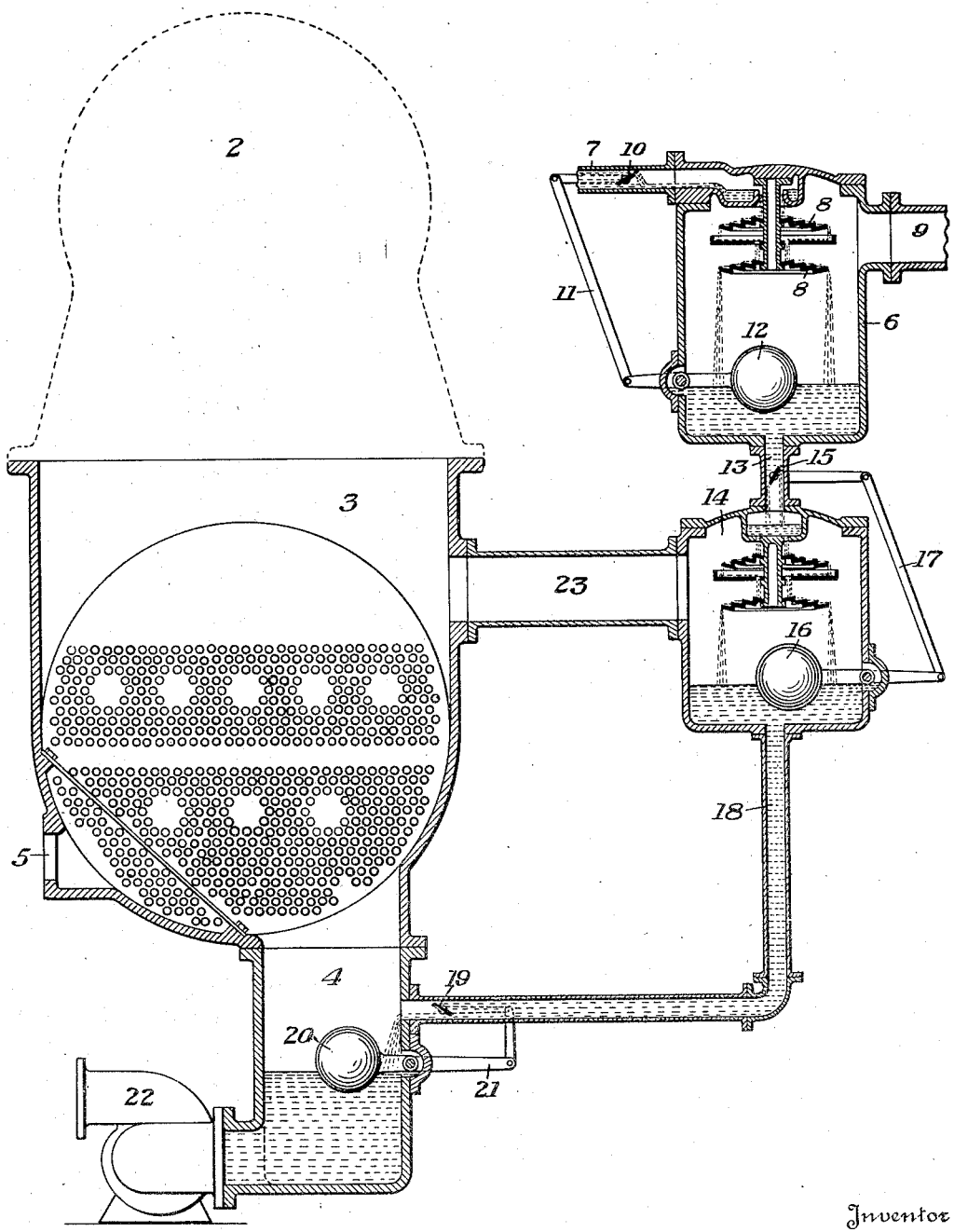

Patented June 16, 1925.

1,542,545

UNITED STATES PATENT OFFICE.

WILLIAM S. ELLIOTT, OF PITTSBURGH, PENNSYLVANIA.

SEPARATION OF AIR AND DISSOLVED GASES FROM LIQUIDS.

Application filed November 26, 1920. Serial No. 426,666.

*To all whom it may concern:*

Be it known that I, WILLIAM S. ELLIOTT, a citizen of the United States, and a resident of Pittsburgh, in the county of Allegheny and State of Pennsylvania, have invented a new and useful Improvement in the Separation of Air and Dissolved Gases from Liquids, of which the following is a full, clear, and exact description, reference being had to the accompanying drawing, which is a sectional elevation, partly diagrammatic, showing a preferred form of apparatus embodying my invention.

My invention has relation to improvements in the separation of air and dissolved gases from liquids, and particularly from the make-up water used in power plants.

My invention is designed to provide apparatus of simple, efficient, and economical character, for carrying out the method of separation described and claimed in my Patent No. 1,321,999, dated November 18, 1919.

The nature of the present invention will be best understood by reference to the accompanying drawing in which I have shown a preferred embodiment, which will now be described, it being premised, however, that various changes can be made in the details of construction, arrangement, and combination of the various parts without departing from the spirit or the scope of my invention as defined in the appended claims.

In this drawing, the numeral 2 indicates (in dotted lines) a prime mover, such as a steam turbine, and 3 a condenser therefor, this condenser being shown as of the tubular form and having a hot well 4. 5 designates an opening through which the air from the condenser may be exhausted by any usual or suitable means.

6 designates a heater which, as shown, is in general similar to the heater shown and described in my said patent, the water entering the heater through the supply connection 7 and being distributed over the pans or baffles 8. 9 designates a connection for supplying steam from any suitable source for raising the temperature of the water or other liquid in the heater. The level of the water in the heater is maintained substantially constant by means of a valve 10 in the supply pipe 7, controlled by suitable connections 11 with a float 12 in the heater. The heater has a bottom discharge pipe 13 leading into the upper portion of the evaporator 14 which, as shown, is also in general of the character shown and described in my said patent. The pipe 13 is provided with a valve 15 which is controlled by the water level in the evaporator, by means of a float 16 and connections 17. 18 is a pipe leading from the lower portion of the evaporator to the hot well 4. A substantially constant level of water is maintained in the hot well by means of a valve 19 in the pipe 18, controlled by a float 20 in the hot well, said float having actuating connections 21 with said valve. 22 designates an exhaust pump for the hot well.

The operation is as follows: The water entering the heater through the pipe 7 may either be raw water or it may be water that has been evaporated and condensed in an ordinary evaporator. While passing through the heater 6, its temperature is raised; and upon being discharged into the evaporator 14, is caused to boil violently, or flash, by reason of the difference in pressure and temperature conditions which are maintained in the evaporator, as more fully described in my said patent. This evaporator is connected with the condenser by a passage 23 so that the vapors and gases from the evaporator pass directly into the condenser, the temperature and pressure in the condenser being substantially the same as the temperature and pressure in the evaporator; while the temperature of the water in the heater is maintained in excess of the temperature of the water in the evaporator and condenser. The vapors released in the evaporator, upon entering the condenser are condensed, and the air and now condensable gases are drawn out of the condenser through outlet connection 5 by means of the usual dry air pump or ejector, the condensate flowing into the hot well, where it mixes with the condensate from the prime mover 2. The purified water in the hot well is pumped out by the pump 22. As the water level falls in the hot well, the valve 19 is actuated to admit an amount of purified make-up water from the evaporator 14 sufficient to maintain a substantially constant level in the hot well.

It will be apparent from the foregoing that the present invention makes it possible to obviate the use of the special condenser shown and described in my said patent, and to utilize instead the regular condenser of the power plant, thus reducing the cost of initial installation and of up-keep. In practice, condensers of this character usually have a relatively high vacua, so that the amount of air remaining in the condensate in the hot well has been greatly reduced as compared to the amount contained in the raw water or in the steam before the steam is condensed. There is, however, considerable wastage in the steam and water required in the plant; and by the present invention this wastage can be made up with water which has also been purified to a high degree. The heater can be arranged to heat the make-up water as well as the returns from the heating system or other auxiliaries about the plant, and can be used either as a surge tank in which all such returns may be collected and purified; or the heater may be connected to such a surge tank.

I claim:

1. In a power plant, the combination with a prime mover and a condenser serving the prime mover, of a heater for the make-up water, an evaporator connected with the condenser and with the heater, and a liquid connection leading from the evaporator to the condenser, said condenser having an outlet for the removal of air therefrom, substantially as described.

2. In a power plant, the combination with a prime mover and a condenser serving the prime mover and having a vapor zone and a condensate zone, of a heater for the make-up water, an evaporator connected with the vapor zone of the condenser and with the heater, a liquid connection leading from the evaporator to the condensate zone of the condenser, said condenser having an outlet for the removal of air therefrom, and means controlled by the amount of water in the condensate zone for controlling said liquid connection, substantially as described.

3. In a power plant, the combination with a prime mover and a condenser serving the prime mover and having a hot well, of a heater for make-up water, an evaporator into which the heater discharges, said evaporator having a vacuum chamber connected with the vacuum chamber of the condenser, said condenser having an outlet for the removal of air therefrom, and an outlet connection from the lower part of the evaporator to the hot well of the condenser, substantially as described.

4. In a power plant, the combination with a prime mover and a condenser serving the prime mover and having a hot well, of a heater for make-up water, an evaporator into which the heater discharges, said evaporator having a vacuum chamber connected with the vacuum chamber of the condenser, said condenser having an outlet for the removal of air therefrom, and an outlet connection from the lower part of the evaporator to the hot well of the condenser, together with means controlled by the level of the water in the hot well for controlling the flow through the last named connection, substantially as described.

In testimony whereof, I have hereunto set my hand.

WILLIAM S. ELLIOTT.